Aug. 28, 1951     D. M. VAN VLEET     2,565,748
SAFETY MEANS FOR UNLOADING LOGGING TRUCKS WHILE IN TRANSIT
Filed March 6, 1950     2 Sheets-Sheet 1
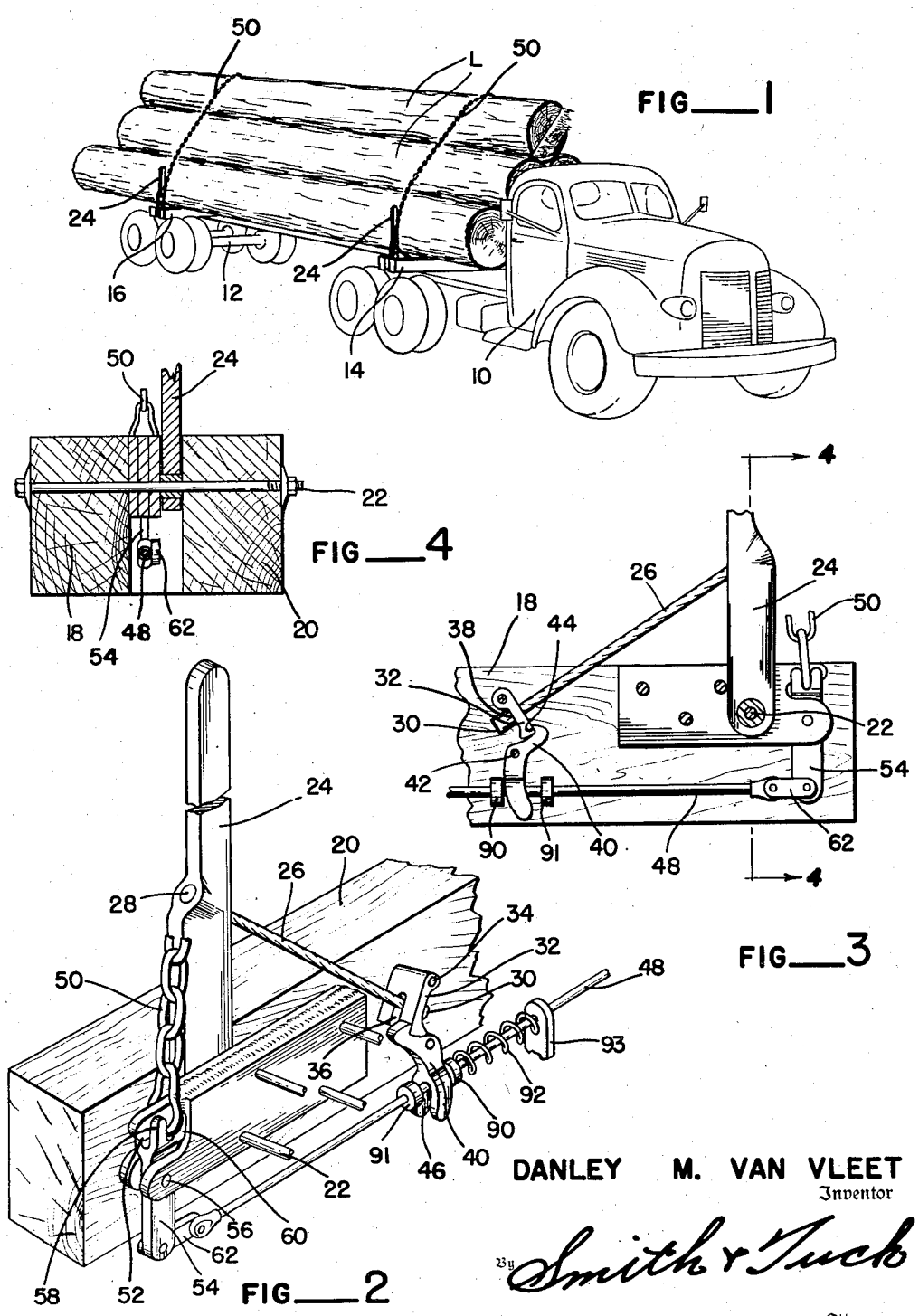
DANLEY M. VAN VLEET
Inventor
By Smith & Tuck
Attorneys Aug. 28, 1951 D. M. VAN VLEET 2,565,748
SAFETY MEANS FOR UNLOADING LOGGING TRUCKS WHILE IN TRANSIT
Filed March 6, 1950 2 Sheets-Sheet 2
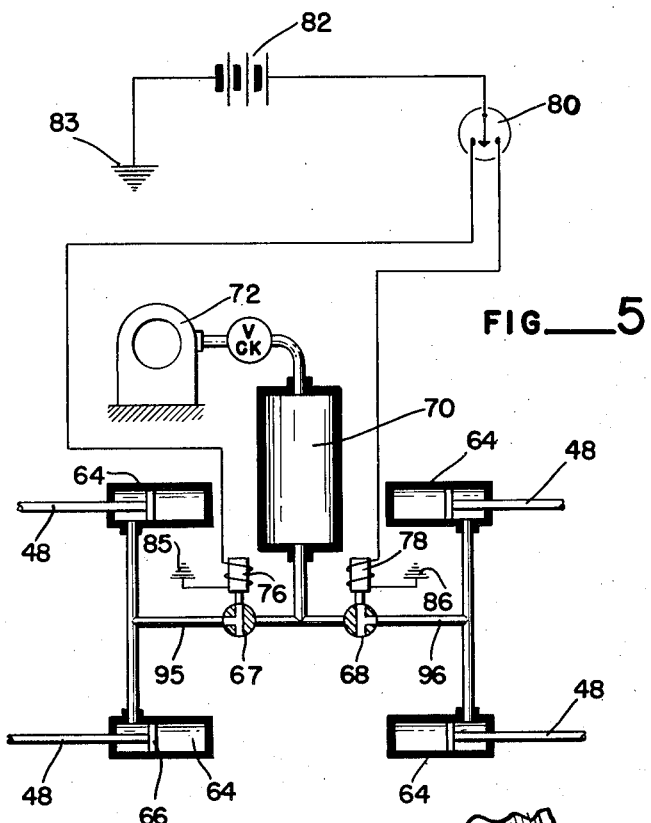
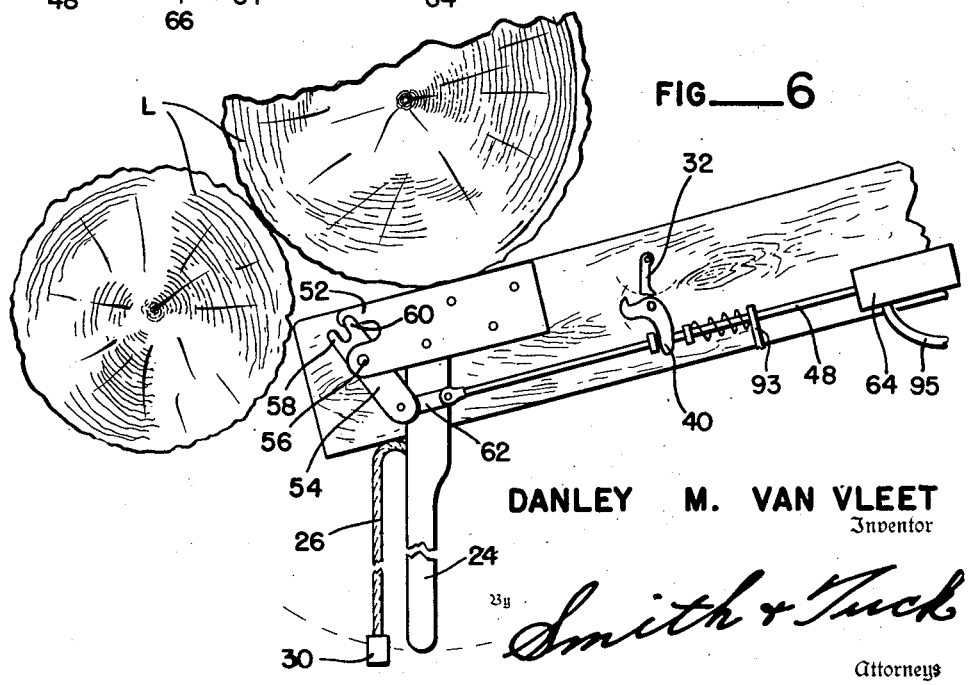
DANLEY M. VAN VLEET
Inventor
By Smith + Tuck
Attorneys Patented Aug. 28, 1951

2,565,748

UNITED STATES PATENT OFFICE 2,565,748

SAFETY MEANS FOR UNLOADING LOGGING TRUCKS WHILE IN TRANSIT

Danley M. Van Vleet, Grand Ronde, Oreg.

Application March 6, 1950, Serial No. 147,945

5 Claims. (Cl. 280—179)

This invention comprehends the arrangement of parts whereby the operator of a logging truck may, from the cab of the truck, discharge the load of logs if he finds that he cannot control the forward movement of his truck, as on steep hills, and the like. To achieve this result means are provided for the sequential unlocking of the load retaining chains and then as a next step, the collective releasing of the truck stacks on the side to which he desires to discharge the load. To achieve this result, control means are provided so that the driver, at his normal position at the wheel of his truck, can effect this emergency discharge of his load.

In recent years there has been a marked change in the methods employed in logging, these methods have been forced upon the loggers due in part, to the improved means available to them, such as the heavy caterpillar tractors and their ability to move logs through the woods, but more particularly is it due to the generally enforced requirements of selective logging wherein it is necessary to remove certain trees from a wooded area without damaging the seed trees that normally have been designated by governmental agencies.

In former methods of logging, large trees and logs required employment of heavy cables and yarding and skidding donkey engines with various forms of cable carriages, which in turn loaded the logs onto rail cars for transportation to mills or other points of delivery. Present practice now is to collect the logs in small piles, normally, by means of caterpillar tractors and to then load them on trucks for transportation considerable distances to the mills or other points of delivery. Now, the loggers who must still operate at a profit must use only semi-improved roads in the logging areas and these are, of course, to a degree, rough and often have unusual grades on them which add greatly to the hazard of the truck hauling operation. Many serious accidents have occurred where the tremendously heavily loaded trucks have gotten out of control, due to the fact that the compression of the engine or the braking system of the truck was inadequate to hold the load on the road on which they operate, and it is to overcome this dangerous condition that this present invention has been provided.

The principal object of this present invention is to provide a safety means for unloading logging trucks which are or threaten to become unmanageable by the operator of the same.

A further object is to provide means whereby the operator of a truck, from his normal driving position, can discharge his load from either side of the truck at any time conditions indicate that the same is necessary.

A further object of this invention is to provide means for first releasing the log holding means which is normally chains and the like, and to then, as a sequentially timed operation, release the truck stakes or stops which have retained the log in position.

A further object of this invention is to provide a combination of mechanical, fluid and remote control means so that the operator of a truck can discharge his load at any time without leaving his normal driving position.

Further objects, advantages and capabilities will be apparent from the description and disclosure in the drawings, or may be comprehended or are inherent in the device.

In the drawings:

Figure 1 is a perspective view illustrating a typical log trailing truck and showing the loading and means for securing the load on the truck;

Figure 2 is a perspective view showing the truck stake or chock with one half of the bunk removed and illustrating the means for holding the stake in operating position, the securing means for the logs securing or positioning chains and the operating rod for sequentially operating the chain-release and the stake-release;

Figure 3 is a view partly in section, taken in a vertical plane transversely of the truck, of a portion of the truck stake and chain assembly;

Figure 4 is a cross sectional view taken along the line 4—4 of Figure 3;

Figure 5 is a diagrammatic diagram showing the various elements employed in the control of this safety unloading means;

Figure 6 is an elevation showing the relative position of the various elements during the unloading operation.

Referring more particularly to the disclosure in the drawings, the numeral 10 designates a tractor type truck of the type commonly used for handling large loads of logs in logging operation, where relatively long logs are handled. This necessitates the employment of a trailer element, as 12, which is normally secured to the truck by means of a reach beam. The trailer 12 normally is supplied with remote control brakes so that the various weight carrying axles lend their full share to the braking effort. In some operations where relatively short logs are handled a long wheel base truck is employed thus dispensing with the trailer unit 12. In the various operations however, it is common to employ two transversely disposed log carrying bunks as 14 and 16. In the form illustrated in Figure 1, it will be necessary that bunk 14 be provided with a pivoting arrangement so that the logs can swing with respect to the axis of the truck when negotiating curves and the like.

Many forms of bunks are used, a common one is to employ two-spaced timbers, as 18 and 20, which are secured in spaced relationship by a plurality of washers and through bolts, 22, one of which may form the pivot for the stake of chock 24. Stake 24 is preferably disposed between members 18 and 20 as a matter of convenience and protection to the equipment. It must be remembered that when the heavy load of logs is released and dumped they are beyond the control of the operator, and the various parts of the equipment must be so arranged that they can either swing out of harm's way or be fully protected by permanent structures.

Throughout the drawings, for the sake of simplicity, a stake construction has been shown for member 24. There are certain conditions, particularly where heavy loads are employed, that it may be desirable to use a more compact chock, but one which would function generally in the same manner as the stakes 24, shown. Stake 24 is positioned for use in a substantially vertical manner, or the top may slant outwardly, slightly. It is held in this position by a tension member, preferably a flexible steel cable 26. This cable is normally fixedly secured to stake 24 as at 28 by having the end of the cable fanned out in a conical recess and the whole held in place by being filled with molten metal such as zinc, or the like. The employment of a flexible member is desirable in that it is very difficult to damage the same due to its yieldability when the loads are discharged. The free ends of cable 26 normally has a ferrule member, as 30, secured to the end thereof as by being held in place by molten metal poured around fanned-out ends so that the ferrule can take the full strain of the cable without being stripped from the end thereof. Means must be provided for holding cable 26 in the operating position against very heavy loading. This is particularly true when the heavy logs L making up the load tend to shift or slide as in going around a curve or when operating on slanting roads. The second requirement is that the securing means be easily releasable and with certainty when the needs arise. This has been achieved by the means probably best illustrated in Figures 2 and 3, wherein a latch member 32 is pivotally supported on a throughbolt or rod 34 and has its free end bifurcated so as to provide an open slot at 36. This slot should be in a position to easily be engaged over cable 26 and a seat must be provided, as at 38, to form an abutment against which ferrule 30 can rest. Latch 32 is held in the operating position by a peculiarly shaped dog member 40. A desired shape for this dog is illustrated in Figure 3, in which the pivot point 42 and the hook 44, which engages the latch, are disposed substantially parallel to cable 26 when it is under strain. In this way the securing means for dog 40 will have the minimum thrust transferred to it and thus, by this compounding of effort through latch 32 and dog 40, a tremendously strong anchorage is provided for cable 26, yet, one which can be released easily and with certainty. The lower end of dog 40 is slotted or otherwise arranged at 46 so as to be engaged by the operating rod 48 which has a function of operating this securing means for cable 26 and a further function in releasing the log-holding cable 50.

Chain 50 is the means usually provided for holding logs L onto bunkers 14 and 16. Normally if the truck were operating on smooth level ground, it is to be presumed that due to the staggered positioning of the logs, the stakes 24 would hold them in place. However, as equipment of this order rarely operates on highly improved roads, under the conditions of use it is found imperative to employ the relatively heavy chains 50, one at each of the bunks after the showing of Figure 1. Due to the strength required in the log holding member, it has been found more practical to employ chains rather than cable which conceivably might be so employed. Chain, being provided with a large number of links, a reasonably snug close adjustment can be provided to accommodate the chain to various sizes of loads.

As the load on a chain is very considerable on rough roads particularly, experience has proved it desirable to have the ends of the chain well secured as to the bunks 14 and 16 and to employ a chain tightening and securing means intermediate the ends. Anchoring the chain ends is achieved by providing a chain engaging lug or tongue 52 which is of such a size as to pass through the various links of the chain and it can be made of adequate strength to hold any load that the chain can possibly put on it due to the natural positioning of its rectangular cross section. As it is necessary to be able to slip the chain off of lugs 52, at any time and under various conditions of loading, the chain must be positioned near the end of the lugs so it will not have to be moved far; and, for this reason, a pivoted release arm 54 is provided which is pivotably mounted at 56, and is provided at its upper end with a plurality of upwardly extending lugs forming the exterior fork 58 and the interior fork 60. Referring to Figure 2, it will be noted that the exterior fork 58 holds the chain in its working position on lug 52. The interior fork 60 is employed only when it is desired to release the chain or strip it off of lug 52. This is achieved by moving the operating rod 48 to the right as viewed in Figure 2, and through the link member 62 revolving the releasing arm 54, thus sliding the chain off of lug 52.

The basic requirement in this equipment is that it is an emergency or safety unloading device which can be operated at any time by the driver of the truck from his driver's position. To achieve this, the means shown diagrammatically in Figure 5 is employed. Each of the rods 48, of which there is one for each stake 24, is connected preferably to a fluid cylinder 64 which a piston 66, which in turn is secured to the operating rod 48. The size of cylinder 64 and the corresponding size of piston 66 will be proportioned in accordance with the fluid used in the operation of the gears. Normally it is convenient on a truck to provide either vacuum pressure, air under pressure, or hydraulic pressure, normally using oil. This latter is probably the easiest to handle although the majority of large trucks have air under relatively high pressure available also. In any case, however, the two operating rods disposed on one side of the vehicle are normally under the control of a single 3 way valve, as indicated at 67 and 68. These valves control fluid pressure from the reservoir or storage tank 70, in which fluid pressure is generated by some form of pump or compressor as 72, which unit is in turn normally connected to the prime mover of the vehicle and derives its energy from that source. Owing to the fact that the rear bunk 16 may be considerably to the rear of the truck proper, the most convenient means of operating valves 67 and 68 is by means of an electric spring loaded solenoid indicated at 76 and 78. The electric energy for the solenoid is obtained either from the main battery of the vehicle or from a separate battery, and is controlled by means of a single pole double contact switch 80. This switching arrangement presumes of course that the opposite side of the battery 82 is grounded as at 83 and that grounds are provided as 85 and 86 adjacent the solenoids for the return or completion of the circuit.

*The method of operation*

In the loading of a truck employing this safety unloading device, in normal practice the stakes 24 are placed in their standing position and the securing cables 26 are engaged in the slotted end of latch 32, after the showing of Figures 2 and 3. Hooks 44 of dogs 40 are then engaged with the free ends of latches 32 and the mechanism so adjusted that the collars fixedly secured to operating rods 48 as 90 and 91 are in the general position shown in Figure 2 with collar 90 in engagement with the dog 40 so as to hold hook 44 in secure engagement with latch 32. This may be achieved by having fluid pressure from the cylinders 64 applying this effort or can be quite simply achieved by a compression spring, as 92, disposed between the fixed abutment 93 and collar 90. A great deal of effort is not required to constantly urge hook 44 into the holding position, due to the particular shape of dog 40 and it is essential that it be constantly applied even though it must be overcome by the fluid cylinders when the gear is released for discharging the load.

Concurrently with the placement of stakes 24, log securing chains 50 are placed over the load and adjusted manually by an intermediate device of common design and the appropriate link of the chains, normally the ends, engaged over lugs 52, and in the position indicated in Figure 2, between the two fork members 58 and 60.

This general arrangement now provides for the immediate dumping of the log load at any time, as a safety measure, and also serves very effectively as a dumping provision when the end of the truck run is reached. In either event, the operation of the mechanism is the same. When it is desired to dump the load, the operator decides which side the logs are to be dumped on. If it is an emergency he must of course consider that the logs will normally go off on the side which is lowest, with respect to the plane of the truck bed and the horizontal. Further, he must have a place where the logs can dump free. It would only be causing a serious wreck, for instance, to dump the logs against a bank on the up-hill side of a mountain road.

When the driver has determined which side he is going to unload from, he then operates switch 80, to energize the appropriate solenoid valve arrangement 67 or 68. As soon as the fluid begins to flow through the fluid supply pipe, as 95 or 96, pistons 66 on one side of the vehicle begin to operate, and in so doing, move the operating rods 48 in a manner corresponding to moving the same to the right, as viewed in Figure 2, or to the left, as viewed in Figure 3. The first action, when the rod 48 is moved far enough, is to slide chain 50 off its confining lug 52. It is to be remembered, however, that the opposite end of the chain will still be held, due to the fact that only one side of the mechanism operates at a time, or is operated during any unloading operation. After the chain 50 is released, a continued movement of rod 48 will take up the slack or spacing between dog 40 and the second collar 91. When this collar abuts dog 40, of course, the opposite collar 90 has already been removed from contact with the dog, and the dog is then revolved sufficiently about its pivot 42 to release hook 44 from latch 32, and this permits latch 32 to revolve sufficiently to release cable 26. Now as the logs have already been freed from the restraining influence of chain 50, the entire load will then roll off the end of bunks 14 and 16 with the various parts of the gear out of harm's way, so that they will be readily available for continued future use as shown in Figure 6. Attention is invited to the necessity of having this sequential operation accomplished by the spacing of collars 90 and 91, so that chains 50 will be released before stakes 24. If stakes 24 were released at the same time as or before chains 50 were released, then the weight of the logs L might place such a strain on chains 50 as to prevent chains 50 from slipping off lug 52 or might cause chains to break.

It is to be understood that the form of my invention, herewith shown and described, is to be taken as a preferred example of the same, and that various changes in the shape, size and arrangement of parts may be resorted to, without departing from the spirit of my invention, or the scope of the following claims.

Having thus fully described my invention, what I claim as new and patentable is:

1. In logging trucks wherein logs are held in place by vertical stakes on the sides of the truck body and by chains running from either side of said truck body over said logs, safety means for remotely releasing said stakes and chains to permit unloading of said logs while the truck is in transit, comprising: each stake pivotally mounted at near its lower end in said truck body; a tension member secured at one end to each stake above the pivotal point; a latch member pivotally mounted, at one end, in said truck body inward from each stake, the free end of said latch member being bifurcated to provide an open slot; the free end of said tension member being enlarged and said open slot being of such size as to secure said enlarged end of said tension member; a dog pivotally mounted in said truck body under each latch member having a hook end engageable with the free end of said latch, the portion of said dog from its point of pivot to its hook end being substantially parallel with said tension member when the tension member is in secured position; an operating rod slidably mounted horizontally in said truck body under each dog; two spaced apart collars on said operating rod; the other end of said dog having a slot and said rod running through said slot with one of said collars on each side of said dog in position to pivot said dog upon movement of said rod; means for remotely operating said operating rods selectively by the driver; members positioned in said body each having a lug extending outboard, said lug being of a size that links of said chain may be engaged thereby; a release arm pivotally mounted below said lug, its upper end being engageable with a link of said chain in position around said lug; and the lower end of each release arm pivotally connected to one of said operating arms.

2. In logging trucks wherein logs are secured by flexible members running from either edge of the truck body over said logs, means for securing said flexible members and releasing them from a remote position, comprising: lugs positioned in said body extending outboard, one for each end of said flexible members; said flexible members having members near each end in which said lug may be positioned; an operating rod slidably mounted in said truck body below each lug; means for operating said rods remotely; a release arm pivotally mounted below each lug in said body, each arm pivotally connected at its lower end to an operating rod, each arm having upstanding fork means to engage a member of said flexible member in position around said lug, to hold said member in place and to disengage the member from said lug upon pivoting of the release arm.

3. In logging trucks wherein logs are secured in place by vertical stakes on the sides of the truck body, means for releasing said vertical stakes from a remote position, comprising: each vertical stake pivotally mounted near its lower end in said truck body to swing outward; an operating rod slidably mounted in said truck body below each stake; means for operating the rods on one side of the truck or the other side selectively from a remote position; a tension member secured at one end to each stake above its point of pivot; latch members pivotally mounted at one end in said truck body, one positioned inward from each stake; the free end of each latch member being bifurcated; the free end of each tension member being enlarged and in position to be engaged by the bifurcated end of a latch member; dogs pivotally mounted in said body each having a hook end engageable with the free end of a latch member, the portion of each dog from its point of pivot to its hook end being substantially parallel with said tension member when the tension member is in a secured position; the other end of each dog having a slot and one of said rods running through said slot; a collar on each rod on either side of the slotted portion of the dog, whereby the dog may be pivoted upon movement of said rod to release said latch.

4. In logging trucks wherein logs are held in place by vertical stakes on the sides of the truck body and by flexible members running from either side of said truck body over said logs, safety means for releasing said stakes and flexible members for discharge of the load of logs during transit, comprising: each stake pivotally mounted near its lower end in said truck body to swing outward; an operating rod slidably mounted in said truck body below each stake; means for remotely operating the rods on either side of the truck selectively by the driver of said truck; a tension member secured at one end to each stake above its point of pivot; latching means positioned in said body operable by movement of said rod; means on the free end of said tension member for engaging said latching means; and means positioned in said body operable by movement of said rods to releasably secure each end of said flexible members.

5. The subject matter of claim 4 in which said means for operating said rod remotely by the driver includes an hydraulic cylinder for each rod; a piston in said cylinder attached to said rod; a source of fluid under pressure; two connecting tubes from said source, one running to the cylinders for the rods on one side of the truck and one for the rods on the other side; an operating valve in each tube; an electric solenoid for each valve in position to operate said valve; a source of electric energy connected to said solenoid; and a switch for selectively operating said solenoids, said switch being in position to be operated by the driver of said truck.

DANLEY M. VAN VLEET.

REFERENCES CITED

The following references are of record in the file of this patent:

UNITED STATES PATENTS

| Number | Name | Date |
| --- | --- | --- |
| 995,633 | Peterson | June 20, 1911 |
| 1,512,771 | Lawler et al. | Oct. 21, 1924 |
| 1,619,958 | Sannar et al. | Mar. 8, 1927 |
| 2,530,776 | Le Tourneau | Nov. 21, 1950 |